(12) United States Patent
Zamanzadeh et al.

(10) Patent No.: US 12,653,112 B1
(45) Date of Patent: Jun. 16, 2026

(54) ELECTROCHEMICAL DRIVEN FLUORESCENT COLORANT PLANT INFUSION

(71) Applicant: AGRIGENICS INC., Presto, PA (US)

(72) Inventors: Mehrooz Zamanzadeh, Pittsburgh, PA (US); Carolyn Tome, Pittsburgh, PA (US)

(73) Assignee: AGRIGENICS INC., Presto, PA (US)

( * ) Notice: Subject to any disclaimer, the term of this patent is extended or adjusted under 35 U.S.C. 154(b) by 0 days.

(21) Appl. No.: 18/967,769

(22) Filed: Dec. 4, 2024

Related U.S. Application Data

(60) Provisional application No. 63/606,628, filed on Dec. 6, 2023.

(51) Int. Cl.
    *A01G 7/04* (2006.01)

(52) U.S. Cl.
    CPC ...................................... *A01G 7/04* (2013.01)

(58) Field of Classification Search
    CPC .................................... A01G 7/04; A01G 9/26
    See application file for complete search history.

(56) References Cited

U.S. PATENT DOCUMENTS

| | | | |
|---|---|---|---|
| 784,346 A | 3/1905 | Pilsoudsky et al. | |
| 882,699 A | 3/1908 | Latshaw | |
| 3,944,916 A | 3/1976 | Tillander | |
| 4,678,554 A * | 7/1987 | Oppitz ................... | B01D 13/02 |
| | | | 204/299 |
| 5,464,456 A | 11/1995 | Kertz | |

| | | | |
|---|---|---|---|
| 8,474,183 B2 | 7/2013 | Krysiak et al. | |
| 11,666,005 B1 | 6/2023 | Zamanzadeh et al. | |
| 2023/0329155 A1 * | 10/2023 | Rosenstock ............. | A01G 7/04 |

FOREIGN PATENT DOCUMENTS

| | | |
|---|---|---|
| CN | 104871845 | 9/2015 |
| RU | 2261588 | 10/2005 |
| WO | 9501090 | 1/1995 |

OTHER PUBLICATIONS

Dr. Perry L., "The How and Why of Plant Color," Summer News Article, Department of Plant and Soil Science, University of Vermont, 1 page, accessed Nov. 2021.
Sanders T., et al., "Color Me Crazy: Effects of Food Dye on Plant Growth," Plant Bio : Ecology & Evolution, Howard Hughes Medical Institute, 1 page, 2016.

(Continued)

*Primary Examiner* — Joshua J Michener
*Assistant Examiner* — Henry Hooper Mudd
(74) *Attorney, Agent, or Firm* — OGC Law, LLC; Thomas Joseph

(57) ABSTRACT

An electrochemical cell has a first electrode inserted into growth media (soil) and a second electrode inserted into a plant at a position above the ground. The first electrode is coupled to the second electrode to form a potential difference therebetween. An injector has charged fluorescent colorants therein. The injector injects the charged fluorescent colorants into plant above the ground and the potential difference drives the charged fluorescent colorants through a portion of the plant that is above the ground. The potential difference can be formed through a galvanic cell, with an external power supply, and/or a solar panel or cell.

20 Claims, 3 Drawing Sheets

(56) References Cited

OTHER PUBLICATIONS

Angstrom Technologies Article, "Ultimate Guide to Fluorescent Pigments and Dyes", Jan. 2023, https://angtech.com/2023/01/10/ultimate-guide-to-fluorescent-pigments-and-dyes/.

AxisPharm, "Classification and application of fluorescent dyes", Aug. 2023 https://axispharm.com/classification-and-application-of-fluorescent-dyes/.

Piston, David, et al., "Introduction to Fluorescent Proteins", NikonsMicroscopyU, https://www.microscopyu.com/techniques/fluorescence/introduction-to-fluorescent-proteins, accessed Nov. 2023.

Snapp, Erik, "Fluorescent Proteins: A Cell Biologist's User Guide", NCBI, NLM, NIH, Oct. 2009, doi: 10.1016/j.tcb.2009.08.002, https://www.ncbi.nlm.nih.gov/pmc/articles/PMC2784028/.

Piston, David, et al., "Introduction to Fluorescent Proteins", Zeiss Microscopy Online Campus, Education in Microscopy and Digital Imaging, https://zeiss-campus. magnet.fsu.edu/articles/probes/fpintroduction.html, accessed Nov. 2023.

* cited by examiner

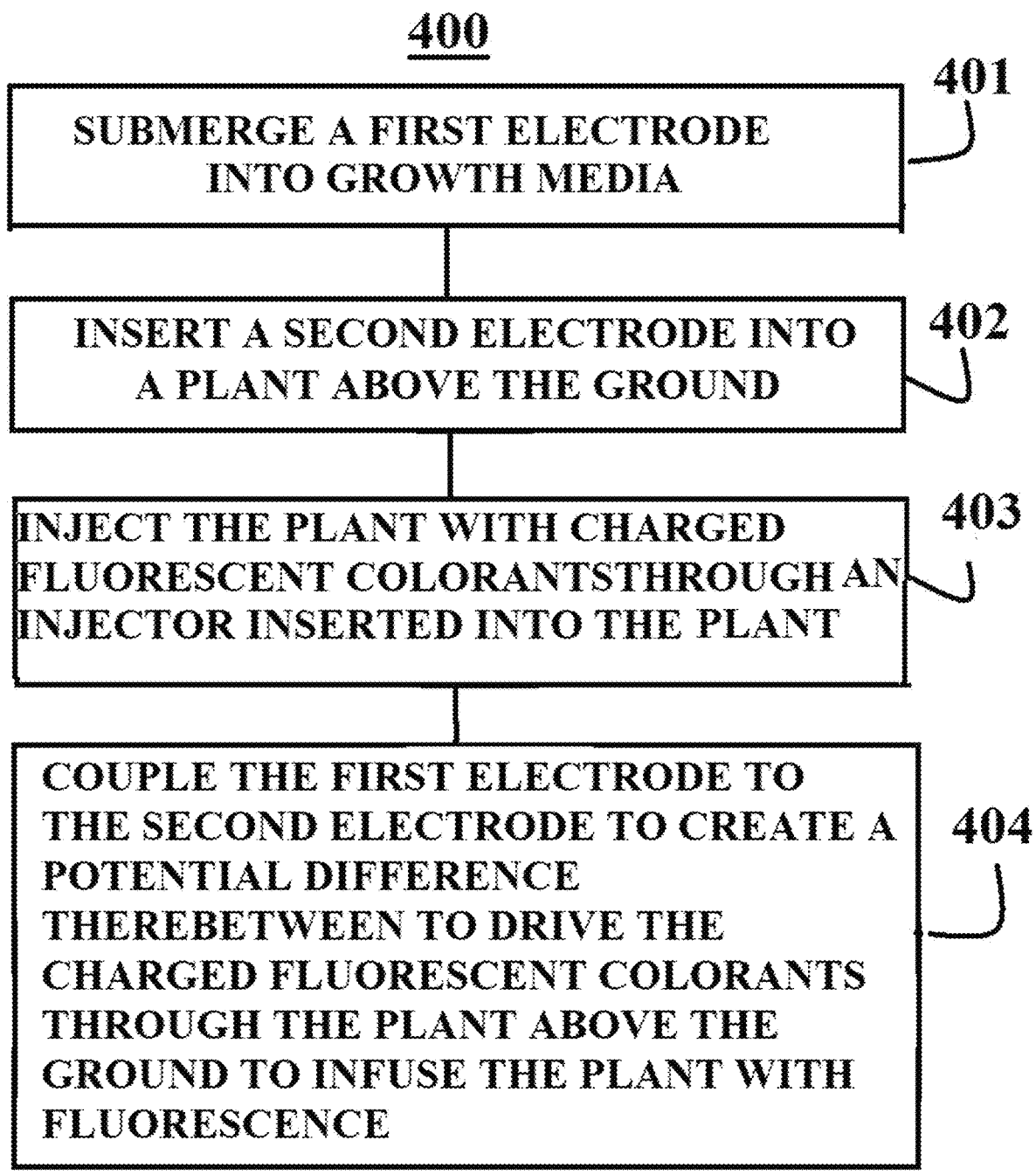

400

SUBMERGE A FIRST ELECTRODE INTO GROWTH MEDIA — 401

INSERT A SECOND ELECTRODE INTO A PLANT ABOVE THE GROUND — 402

INJECT THE PLANT WITH CHARGED FLUORESCENT COLORANTSTHROUGH AN INJECTOR INSERTED INTO THE PLANT — 403

COUPLE THE FIRST ELECTRODE TO THE SECOND ELECTRODE TO CREATE A POTENTIAL DIFFERENCE THEREBETWEEN TO DRIVE THE CHARGED FLUORESCENT COLORANTS THROUGH THE PLANT ABOVE THE GROUND TO INFUSE THE PLANT WITH FLUORESCENCE — 404

FIG. 4

ELECTROCHEMICAL DRIVEN FLUORESCENT COLORANT PLANT INFUSION

CROSS REFERENCE TO RELATED APPLICATION

This application claims the benefit under 35 U.S.C. § 119 (e) of U.S. Provisional Application No. 63/606,628 entitled "ELECTROCHEMICAL DRIVEN FLUORESCENT COLORANT PLANT INFUSION" filed Dec. 6, 2023 which is incorporated herein by reference.

BACKGROUND

The use of fluorescent dyes in such biochemistry-related applications is well-known. Such dyes are typically used to stain sections of biochemical material for optical inspection. With the continuous development of biotechnology, computer technology and fluorescence spectrometry technology, many dyes, especially fluorescent dyes, have been widely used in cell detection, tumor gene protein analysis, toxic analysis, clinical medical diagnosis and so on. However, such uses are not directly applicable to ornamental applications of florescence to plants.

The ornamental coloring of plants and their various parts, such as leaves, flowers, and fruits, is well-know. Such applications are important for both aesthetic reasons and other reasons. Plant colors serve to attract insects, birds, and animals for both pollination and seed dispersal. In many cases, the color of a flower comes from reflected light from various chemical compounds called plant pigments.

There are three main groups of plant pigments, anthrocyanins, carotenoids, and betalains. Anthocyanins are a group of flavonoid chemicals (phenolic compounds) that are responsible for many colors, from orange and red to violet and blue. Carotenoids are terpenoid chemicals that are responsible for yellows, oranges, and reds. Betalains are less common in plants. Betalains are found, primarily, in c aryophyllales, which include *dianthus*, cacti, and beets.

Anthocyanins are composed of anthocyanidin chemicals to which sugars are attached. Delphinidin imparts the blue color to delphinium, as well as to violas and grapes producing Cabernet Sauvignon wine. Malvidin imparts blue to the flowers of some primroses, is the main pigment in red wines, is found in perennial geraniums and petunias, and of course is in mallows (Malva). Pelargonidin is of course in the red annual geranium (*Pelargonium*), as well as in many red fruits from strawberries to raspberries and cranberries. Purplish-red colors in peonies are from peonidin.

Carotenoids can cause carrots to be yellow and orange and can cause tomatoes to be red. The two main groups of carotenoids are xanthophylls and carotenes. The latter are what make cantaloupes and carrots orange. The carotenoid in most red tomatoes is lycopene.

Other factors can affect the color of plants. Temperature affects color, hence, there are often more vivid colors in cool northern gardens than hot summer ones. Plant stress, such as from drought, insect attack, or plant nutrition (too much or little) also can cause different levels of pigments in flowers, and. as a result, different colors.

Dyes and other coloring agents have been used in various experiments on plants. One such type of experiment involves the use of dye that can be absorbed through capillary action in which water is taken up through plant roots from the soil. In such experiments, dye is placed in the surrounding soil for absorption into the plant. Then, the plant is dissected, so that the amount of absorbed dye can measured. Through such experiments, it has been determined that some dyes will not adversely affect plant growth.

Additionally, electric fields constitutes external stimuli that can affect plants because plants include many types of polymers and polymer networks. Changes in polymer network structure as a result of electrical field application are well known. High-intensity electrical field pulses and their effects on dehydration characteristics and rehydration properties of potato cubes and other vegetables are known.

U.S. Pat. No. 11,666,005 to Zamanzadeh et al. discloses electrochemical systems, methods, and kits for coloring plants in growth media. The growth media has an aqueous solution having an electrolyte with a plurality of charged coloring agents therein. An electrochemical cell has a first electrode inserted into the growth media and a second electrode inserted into the plant with the first electrode being coupled to the second electrode to form a potential difference therebetween. The potential difference drives the plurality of charged coloring agents from the growth media into the plant to color the plant.

While the known methods for coloring plants may seem directly applicable to the infusion of fluorescent matter, such techniques have proven to be too time consuming and inefficient. As a result, an improved system for infusing fluorescence into plants is needed.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementation, an electrochemical system for infusing fluorescence into a plant in the ground having growth media therein is provided. The growth media includes an aqueous solution having an electrolyte therein. An electrochemical cell has a first electrode inserted into the growth media and a second electrode inserted into the plant above the ground with the first electrode being coupled to the second electrode to form a potential difference therebetween. An injector has charged fluorescent colorants therein. The injector injects the charged fluorescent colorants into plant above the ground and the potential difference the charged fluorescent colorants through a portion of the plant that is above the ground.

In other implementations, a method for infusing fluorescence into a plant in the ground having growth media therein is provided. The growth media includes an aqueous solution having an electrolyte therein. A first electrode is submerged into the growth media. A second electrode is inserted into the plant above the ground. The plant is injected with charged fluorescent colorants through an injector inserted into the plant. The first electrode and second electrode to create a potential difference therebetween to drive the charged fluorescent colorants through the plant above the ground to infuse the plant with fluorescence.

In yet other implementations, a kit for infusing fluorescence into a plant in the ground having growth media therein is provided. An electrochemical cell has a first electrode for inserting into ground having growth media therein and a second electrode for inserting into the plant above the ground with the first electrode being coupled to the second electrode to form a potential difference therebetween. An injector has charged fluorescent colorants therein. The injector has the ability to inject charged fluorescent colorants into plant above the ground, so that the potential difference can drive the charged fluorescent colorants through a portion of the plant that is above the ground.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 4 is an exemplary process in accordance with the disclosed subject matter.

DETAILED DESCRIPTION

Figure 1:
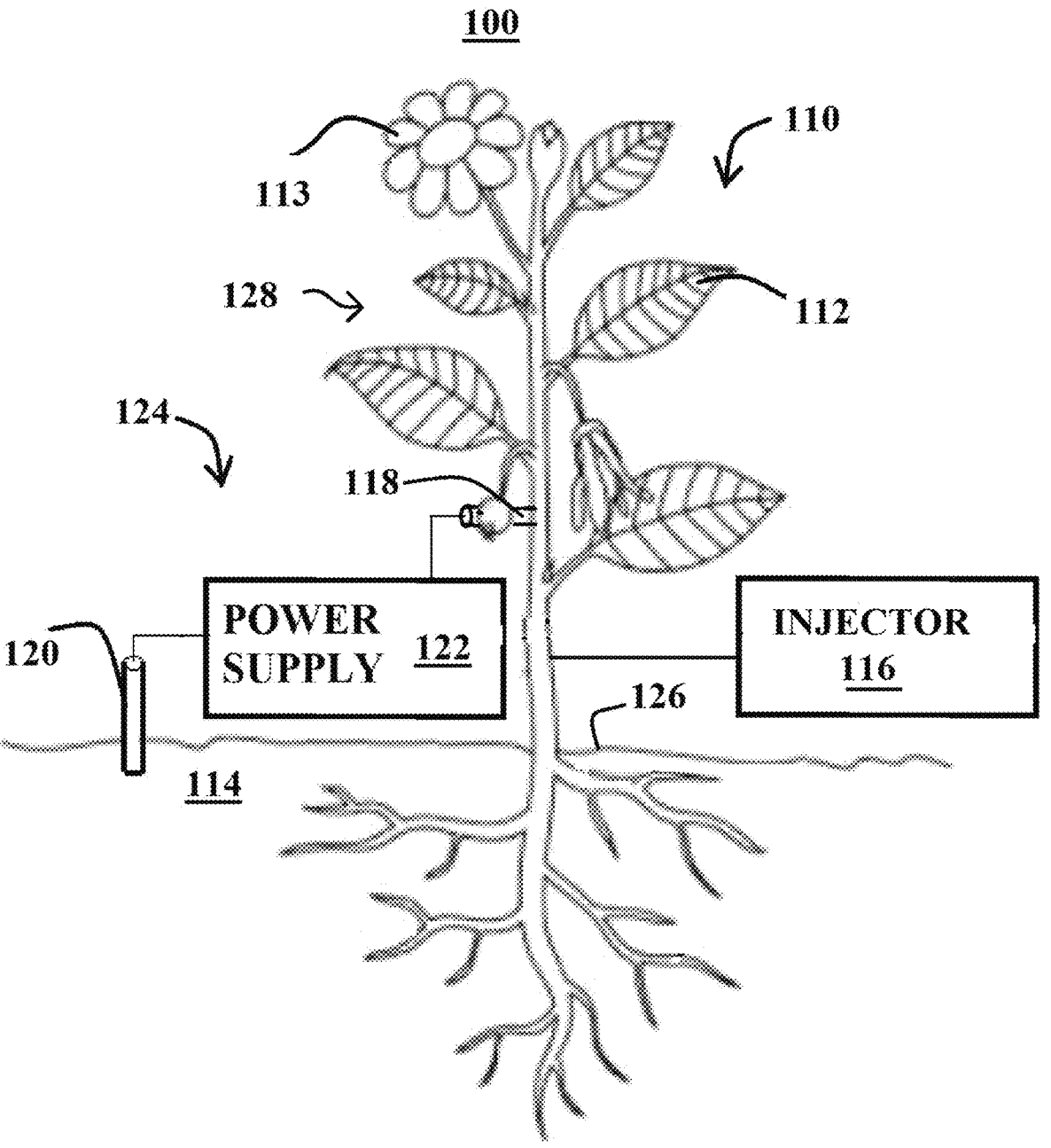
FIG. 1 is a schematic diagram of a system for infusing fluorescence into plants in accordance with the disclosed subject matter.

The subject disclosure is directed to systems, methods, and kits for infusing plants with fluorescence electrochemically. More specifically, the subject disclosure is directed to the establishment of an electrochemical cell through the insertion of one electrode into a plant above the ground and another electrode into soil in fluid communication with the plant. An injector holding charged fluorescent colorants injects the charged fluorescent colorants into the soil or in the plant, so that a potential difference can be established between the electrodes to drive the charged fluorescent colorants into the plant above the ground.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

It is known that coloring agents, such as colorants, color additives, dyes, and pigments, can color various materials, including organisms such as plants. It is further known that the coloring process of plants can be improved through the use of an electrochemical cell that can drive charged coloring agents that are present in growth media, such as soil, into plants. The electrochemical cell can be formed by inserting one electrode into a plant and a second electrode that is in fluid contact with the soil. The potential difference between the electrodes can drive the charged coloring agents from the soil into the plant to color the plant. The system is disclosed in U.S. Pat. No. 11,666,005 to Zamanzadeh et al., the entire disclosures of which, except for any definitions, disclaimers, disavowals, and inconsistencies, are incorporated herein by reference.

Unexpectedly, it has been discovered that the system disclosed in U.S. Pat. No. 11,666,005 is not suitable for infusing plants with charged fluorescent colorants due to the fact that many fluorescent colorants include larger and/or long-chain molecules that have a difficult time travelling from plant roots to the portions of the plant that are above-ground. Accordingly, the system can be modified as set forth in this disclosure to provide improved systems, methods, and kits for infusing fluorescence into plants.

Referring now to FIG. 1, there is shown a system, generally designated by the numeral 100, for infusing a plant 110 or portions of the plant 110, such as leaves 112 and flowers 113, with fluorescence. The plant 110 can be growing in growth media 114 that includes electrolytes therein. The electrolytes can circulate from the growth media 114 into the plant 110.

The system 100 can include an injector 116, a pair of electrodes 118-120 and, optionally, a power supply 122. The injector 116 can be any suitable injecting device, such as a syringe, or system that includes a chamber or other similar component for holding charged fluorescent colorants therein. In an exemplary embodiment, the power supply 122 is a battery. The system 100 can be provided in an assembled form or as a kit for assembly to farmers, gardeners, and other people with interest in either home agriculture or industrial agriculture. In some embodiments, the power supply 122 can be configured to supply power in a manner that mimics natural cycles produced by the sun.

The power supply 122 is optional because, in some embodiments, the pair of electrodes 118-120 can form a galvanic cell. Alternatively, the power supply 122 can be external power supply, such as a solar cell, to create potential difference and to cause electro-migration of ions, so that the plant 110 can absorb the ions.

The system 100 comprises an electrochemical cell 124 having a first electrode 118 and a second electrode 120. The first electrode 118 is inserted into the plant 110 above the ground 126 and the second electrode 120 is inserted into the growth media 114. Alternatively, the second electrode 120 can be attached to the plant 110 at a position below the first electrode 118 on the plant 110. In some embodiments, the first electrode 118 can form an active alloy anode with the second electrode 120 forming a passive alloy cathode. In other embodiments, the first electrode 118 can form a passive alloy cathode while the second electrode 120 can form a corresponding active alloy anode.

Once the electrodes 118-120 have been positioned and the electrochemical cell 124 has been formed, the injector 116 can injected the charged fluorescent colorants into the plant 110, so that a potential difference formed between the electrodes 118-120 can drive the charged fluorescent colorants into an upper portion 128 of the plant 110 that is located above the ground 126.

The positioning of the electrodes 118-120 will depend upon charge on the charged fluorescent colorants within the injector 116. In embodiments in which the charged fluorescent colorants have a negative charge, the first electrode 118 will be an anode. In embodiments in which the charged fluorescent colorants have a positive charge, the first electrode 118 will be a cathode. In embodiments that use polarized charged fluorescent colorants, such as zwitterionic fluorescent colorants, the first electrode 118 can function as either an anode or a cathode.

Accordingly, the second electrode 120 can be configured to correspond to the positioning of the first electrode 118. In the embodiment where the first electrode 118 is an anode, the second electrode 120 can be a cathode. In the other embodiment where the first electrode 119 is a cathode, the second electrode 120 can be an anode.

In a galvanic cell, the terms "active alloy" and "passive alloy" should be understood in relation to one another, such that the active alloy is higher on a galvanic series for a given growth media than the passive alloy. The relationship of the active alloy to the passive alloy on the galvanic series can create a potential difference between an active alloy anode and a passive alloy cathode when the electrodes are placed, at least partially, in the plant 110 and the growth media 114.

The active alloy anode and the cathode can form the electrochemical cell 124 in some embodiments because the growth media 114 includes an aqueous solution that includes the charged coloring agents 116. In other embodiments, the power supply 122 can create or enhance the potential difference between the electrodes 118-120.

The plant 110 can be any suitable plant for fluorescence, such as plants that produce fruits, vegetables, medicinal plant products, crops, and/or other useful plant products. In this exemplary embodiment, the plant 110 can be a flowing plant, a fruit plant, or a vegetable plant. Additionally, the plant 110 can be an edible plant or a non-edible plant.

The aqueous component of the growth media 114 can be any suitable aqueous solution. The aqueous solution can be an alkaline solution, an acid solution, or another water-based solution. Other suitable aqueous solutions can include potable water and low conductivity water.

The charged fluorescent colorants can be any suitable fluorescent material that can be moved by an electric field within a liquid solution, emulsion, colloidal suspension, or other similar system. Suitable charged fluorescent colorants include compounds that include colorants, color additives, dyes, pigments, proteins, liquids having fluorescent components, or combinations thereof. In an exemplary embodiment, the charged fluorescent compounds are water soluble to facilitate the creation of charged ions.

In some embodiments, the charged fluorescent colorants can include food coloring to enhance edible properties of the plant 110. Additionally, the charged fluorescent colorants can include, such as anions, cations, and polarized zwitterions.

The charged fluorescent colorants can be non-toxic. In some embodiments, non-toxic should be understood to contain less than 50% of toxic materials or substances. Toxic materials include substances that produce personal injury or illness to humans when inhaled, swallowed, or absorbed through the skin. Additionally, toxic materials can cause long-term chronic effects like cancer, birth defects, or neurotoxicity.

The charged fluorescent colorants can include little or no corrosive components or irritants. Corrosive components include components that destroy living tissue such as skin or eyes by chemical action. Irritants can be corrosive and cause a substantial injury to the area of the body within which it contacts. Irritation can occur after immediate, prolonged, or repeated contact.

The charged fluorescent colorants can be environmentally friendly, non-poisonous, and edible. Edible substances are substances that are safe for humans to cat.

Exemplary fluorescent colorants include fluorescein dyes, such as fluorescein isothiocyanate (FITC), hydroxyfluorescein (FAM), tetrachlorofluorescein (TET), etc. and their analogs. Other exemplary fluorescent colorants include rhodamine dyes, such as red rhodamine (RBITC), tetramethylrhodamine (TAMRA), rhodamine B (TRITC), and other similar substances. TRITC emits yellow fluorescence at 570 nm when excited at 550 nm.

Other exemplary fluorescent colorants include cy series cyanine dyes, such as cyanine dyes that include two heterocyclic ring systems that include Cy2, Cy3, Cy3B, Cy3.5, Cy5, Cy5.5, Cy7, cy7 nhs ester, cy3b nhs ester and their analogs.

Additional fluorescent colorants include Alexa series dyes, such as alexa fluor 350, 405, 430, alexa fluor 488 maleimide, 532, 546, 555, 568, 594, 610, 633, alexa 647 nhs ester, 680, 700, and 750.

Further, APDye Fluors can be suitable fluorescent colorants. Such colorants are fluorescent dyes that are bright in color, optically stable, very good in light stability of dyeing brightness, and very economical.

Fluorescent colorants can include protein dyes, such as phycoerythrin (PE), phycocyanin (PC), allophycocyanin (APC), polydinoxanthin-chlorophyll protein (preCP), and other similar proteins.

Additional exemplary charged fluorescent colorants include fluorescent coumarin dyes, such as C.I. Disperse Yellows 82 (2a), 184 (2d), 186 (3) and 232 (2d), and C.I. Disperse Reds 277 (5a) and 374 (5b). Other exemplary fluorescent colorants include the aminonaphthalimides, such as C.I. Disperse Yellows 11 (6a) and 199 (8), and Orange 32 (9), the benzothioxanthone, such as C.I. Disperse Reds 303 (mixture of 12 and 13), and the heterocyclic C.I. Disperse Yellow 139 (17). Additional exemplary fluorescent colorants include water-soluble fluorescent cationic dyes, such as the coumarin C.I. Basic Yellow 40 (6a) and the methine dyes C.I. Basic Red 13 (16a) and C.I. Basic Violet 7 (16b).

The geometric configuration of the electrochemical cell 124 can be modified to adapt the specific needs by users with ordinary skills in the art. Such users would understand that the electrodes 118-120 can have any suitable geometric configuration. The electrodes 118-120 can be in the form of wire, mesh, foil, an ingot, sheet or wire. The construction and allocation of the first electrode 118 and second electrode 120 are modifiable and adaptable based on the condition of each application.

Figures 2, 3:
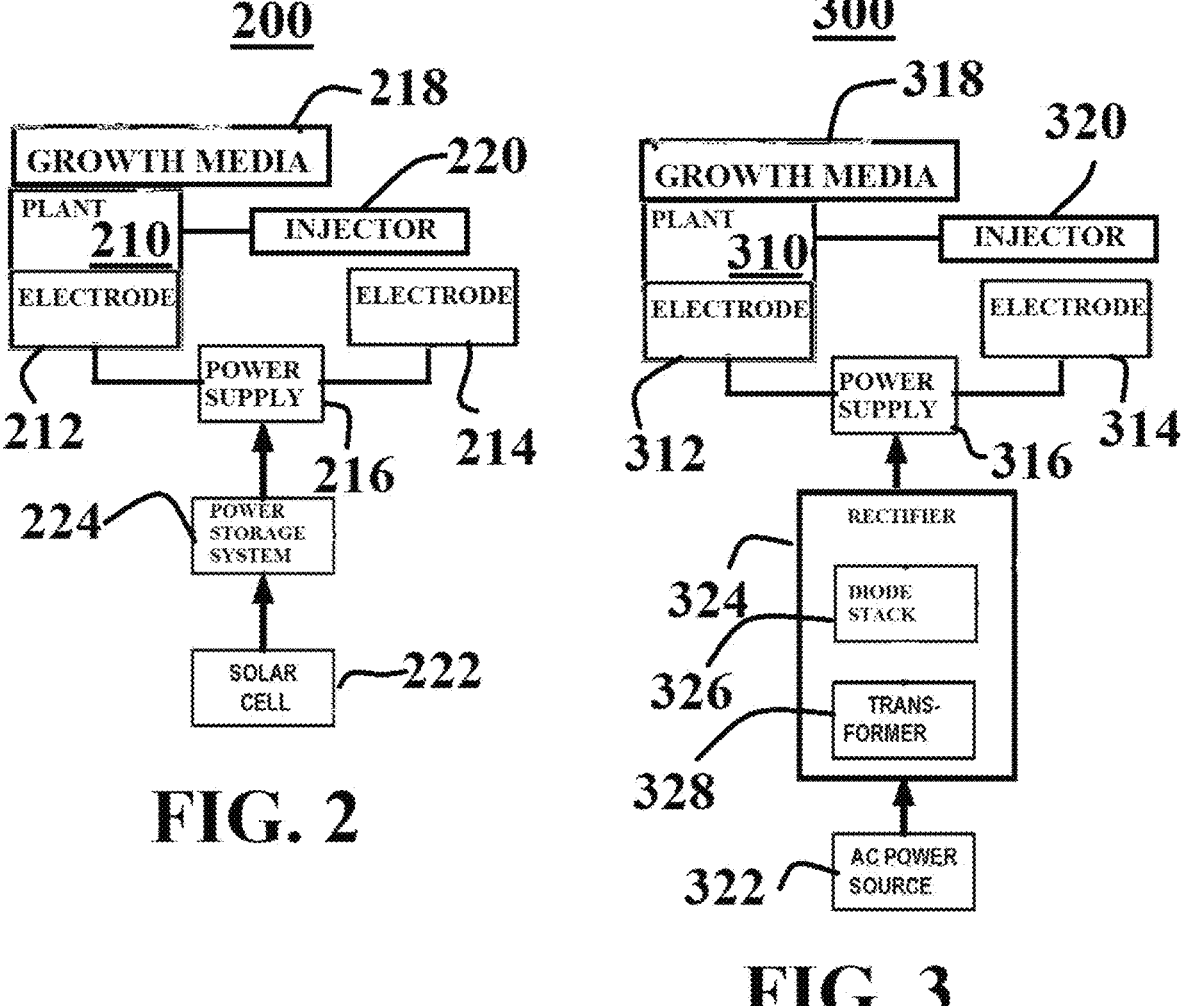
FIG. 2 is a block diagram of another embodiment of a system for infusing fluorescence into plants in accordance with the disclosed subject matter.
FIG. 3 is a block diagram of another embodiment of a system for infusing fluorescence into plants in accordance with the disclosed subject matter.

Referring now to FIG. 2 with continuing reference to the foregoing figure, another embodiment of a system, generally designated by the numeral 200, for infusing a plant 210 with fluorescence is shown. Like the embodiment shown in FIG. 1, the system 200 includes a pair of electrodes 212-214, a power supply 216, growth media 218, and an injector 220 for injecting the charged fluorescent colorants into the plant 210. The first electrode 212 is inserted into the plant 210 above the ground, and the second electrode 214 is inserted into the growth media 218. The first electrode 212 can take on the role of an anode while the second electrode 214 can take on the role of a cathode, correspondingly. Vice versa, the first electrode 212 can take on the role of a cathode while the second electrode 214 can take on the role of an anode.

The potential difference between the first electrode 212 and the second electrode 214 can form an electrochemical cell, as the growth media 218 can include aqueous solutions that circulated through the plant 210.

In this exemplary embodiment, the power supply 216 can receive power from a solar cell 222. The solar cell 222 can connect to a power storage system 224 that can include one or more devices for storing power when the solar cell 222 cannot convert a sufficient amount of solar energy into electricity to power the system 200. The solar cell 222 can be formed from any suitable solar collecting device, such as a solar panel or solar panel assembly. The potential difference in this embodiment can be created or enhanced through the power supply 216 and/or the solar cell 222.

Referring now to FIG. 3 with continuing reference to the foregoing figures, another embodiment of a system, generally designated by the numeral 300, for infusing a plant 310 with fluorescence is shown. In this exemplary embodiment, the system 300 includes a pair of electrodes 312-314, a power supply 316, growth media 318, and an injector 320 for injecting charged fluorescent colorants into the plant 310.

The first electrode 312 is inserted into the plant 310, and the second electrode 314 is inserted into the growth media 318. The first electrode 312 can take on the role of an anode while the second electrode 314 can take on the role of a cathode, correspondingly. Vice versa, the first electrode 312 can take on the role of a cathode while the second electrode 314 can take on the role of an anode.

The potential difference between the first electrode 312 and the second electrode 314 can form an electrochemical cell, as the growth media 318 can include aqueous solutions. The potential difference in this embodiment can be created or enhanced through the power supply 316.

In this exemplary embodiment, the power supply 316 can receive power from an AC power source 322. The AC power source 322 can send power to the power supply 316 through a rectifier 324 that includes a diode stack 326 and a transformer 328.

Referring now to FIG. 4 with continuing reference to the foregoing figures, an exemplary method, generally designated with the numeral 400, for infusing plants with fluorescence is shown. The method 400 can be performed using the system 100 shown in FIG. 1, the system 200 shown in FIG. 2, and/or the system 300 shown in FIG. 3. The growth media includes charged coloring agents.

At step 401, a first electrode is submerged into growth media. In this exemplary embodiment, the first electrode can be the electrode 118 in FIG. 1, the electrode 212 in FIG. 2, and/or the electrode 312 in FIG. 3. The growth media can be the growth media 114 shown in FIG. 1, the growth media 218 shown in FIG. 2, the growth media 318 shown in FIG. 3.

At step 402, a second electrode is inserted into a plant above the ground. In this exemplary embodiment, the second electrode can be the electrode 120 in FIG. 1, electrode 214 in FIG. 2, and/or the electrode 314 in FIG. 3. The plant can be the plant 110 shown in FIG. 1, the plant 210 shown in FIG. 2, and/or the plant 310 shown in FIG. 3.

At step 403, the plant is injected with charged fluorescent colorants through an injector inserted into the plant. In this exemplary embodiment, the injector can be the injector 116 in FIG. 1, the injector 220 in FIG. 2, and/or the injector 320 in FIG. 3.

At step 404, the first electrode is coupled to the second electrode to create a potential difference therebetween to drive the charged fluorescent colorants through the plant above the ground to infuse the plant with fluorescence. In this exemplary embodiment, the charged fluorescent colorants can be driven into an upper portion of the plant, such as the upper portion 128 of the plant 110 shown in FIG. 1.

As demonstrated in FIG. 2 and FIG. 3, step 404 can be modified and adapted for specific needs of each application. In some embodiments, the electrochemical system for infusing fluorescence into plants would utilize a power source or solar panel to create or enhance the power potential difference between the first electrode and the second electrode. The orientation of the first electrode and the second electrode in relation to the growth medium can create an electrochemical cell, as shown in FIG. 1, which can further be supplemented with a power source. The electrochemical cell can be supplemented by a solar power source as in FIG. 2, such that the solar cell 222 collects and generates power to be stored in power storage system 224. In the situation the electrochemical cell requires additional power supply to enhance the potential in order to drive the fluorescent colorants to the plant, the power source can provide the boost to the power supply 216. In other embodiments, such as demonstrated in FIG. 3, an AC power source 322 can be provided along with the rectifier 324 to boost the power supply 316. It is understood that a person with ordinary skills in the art would be able to modify the design and configuration for the power supply to better suit the need to each application that utilizes the present system. It is foreseeable that other power supply sources can be utilized to create or enhance the power potential difference between the first electrode and the second electrode, such the charged fluorescent colorants can be driven from the growth medium to the plant.

Supported Features and Embodiments

The detailed description provided above in connection with the appended drawings explicitly describes and supports various features of apparatus and methods for infusing plants with fluorescence. By way of illustration and not limitation, supported embodiments include an electrochemical system for infusing fluorescence into a plant in the ground having growth media therein, wherein the growth media includes an aqueous solution or soil having an electrolyte therein, the electrochemical system comprising: an electrochemical cell having a first electrode inserted into the growth media or soil and a second electrode inserted into the plant above the ground with the first electrode being coupled to the second electrode to form a potential difference therebetween; and an injector having charged fluorescent colorants therein; wherein the injector injects the charged fluorescent colorants into plant above the ground and the potential difference drives the charged fluorescent colorants through a portion of the plant that is above the ground.

Supported embodiments include the foregoing electrochemical system, wherein the charged fluorescent colorants include a compound selected from the group consisting of a pigment, a dye, a color additive, a protein, and a liquid having a fluorescent component therein.

Supported embodiments include any of the foregoing electrochemical systems, wherein the charged fluorescent colorants include ions selected from the group consisting of anions, cations, and polarized zwitterions.

Supported embodiments include any of the foregoing electrochemical systems, wherein the charged fluorescent colorants include anions and the second electrode is an anode.

Supported embodiments include any of the foregoing electrochemical systems, wherein the charged fluorescent colorants include cations and the second electrode is a cathode.

Supported embodiments include any of the foregoing electrochemical systems, wherein the injector includes a syringe.

Supported embodiments include any of the foregoing electrochemical systems, wherein the electrochemical cell is a galvanic cell.

Supported embodiments include any of the foregoing electrochemical systems, further comprising: a DC power source connecting to first electrode to the second electrode to impress a potential difference therebetween.

Supported embodiments include any of the foregoing electrochemical systems, wherein the DC power source is a solar cell.

Supported embodiments include any of the foregoing electrochemical systems, wherein the DC power source includes an AC power source and a transformer.

Supported embodiments include any of the foregoing electrochemical systems, wherein the injector injects the charged fluorescent colorants into plant below the second electrode, so that the fluorescent colorants are initially injected into the plant between the ground and the second electrode.

Supported embodiments include a method for infusing fluorescence into a plant in the ground having growth media therein, wherein the growth media includes an aqueous solution having an electrolyte therein, the method comprising: submerging a first electrode into the growth media; inserting a second electrode into the plant above the ground; injecting the plant with charged fluorescent colorants through an injector inserted into the plant; and coupling the first electrode to the second electrode to create a potential difference therebetween to drive the charged fluorescent colorants through the plant above the ground to infuse the plant with fluorescence.

Supported embodiments include the foregoing method, wherein the charged fluorescent colorants include a compound selected from the group consisting of a water soluble compound, a dye, a color additive, a protein, and a liquid having a fluorescent component therein.

Supported embodiments include any of the foregoing methods, wherein the charged fluorescent colorants include ions selected from the group consisting of anions, cations, and polarized zwitterions.

Supported embodiments include any of the foregoing methods, wherein the charged fluorescent colorants include anions and the second electrode is an anode.

Supported embodiments include any of the foregoing methods, wherein the charged fluorescent colorants include cations and the second electrode is a cathode.

Supported embodiments include any of the foregoing methods, further comprising: coupling a power source to first electrode and the second electrode to create the potential difference therebetween.

Supported embodiments include a kit for infusing fluorescence into a plant in the ground having growth media therein, the kit comprising: an electrochemical cell having a first electrode for inserting into ground having growth media therein and a second electrode for inserting into the plant above the ground with the first electrode being coupled to the second electrode to form a potential difference therebetween; and an injector having charged fluorescent colorants therein; wherein the injector has the ability to inject charged fluorescent colorants into plant above the ground, so that the potential difference can drive the charged fluorescent colorants through a portion of the plant that is above the ground.

Supported embodiments include the foregoing kit, wherein the charged fluorescent colorants include a compound selected from the group consisting of a pigment, a dye, a color additive, a protein, and a liquid having a fluorescent component therein.

Supported embodiments include any of the foregoing kits, wherein the charged fluorescent colorants include ions selected from the group consisting of anions, cations, and polarized zwitterions.

Supported embodiments include an apparatus and/or means for implementing any of the foregoing systems, methods, kits or portions thereof.

Supported embodiments can provide various attendant and/or technical advantages in terms of a simple, low cost instrumentality to infuse fluorescence into plants using natural galvanic currents and/or impressed currents.

Supported embodiments include a system that can move charged fluorescent colorants into plants to infuse fluorescence therein.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An electrochemical system for infusing fluorescence into a plant in the ground having growth media therein,
    wherein the growth media includes an aqueous solution having an electrolyte therein, the electrochemical system comprising:
    an electrochemical cell having a first electrode inserted into the growth media and a second electrode inserted into the plant above the ground with the first electrode being coupled to the second electrode to form a potential difference therebetween; and
    an injector having charged fluorescent colorants therein; wherein the injector injects the charged fluorescent colorants into plant above the ground and the potential difference drives the charged fluorescent colorants through a portion of the plant that is above the ground.

2. The electrochemical system of claim 1, wherein the charged fluorescent colorants include a compound selected from the group consisting of a pigment, a dye, a color additive, a protein, and a liquid having a fluorescent component therein.

3. The electrochemical system of claim 1, wherein the charged fluorescent colorants include ions selected from the group consisting of anions, cations, and polarized zwitterions.

4. The electrochemical system of claim 3, wherein the charged fluorescent colorants include anions and the second electrode is an anode.

5. The electrochemical system of claim 3, wherein the charged fluorescent colorants include cations and the second electrode is a cathode.

6. The electrochemical system of claim 1, wherein the injector includes a syringe.

7. The electrochemical system of claim 1, wherein the electrochemical cell is a galvanic cell.

8. The electrochemical system of claim 1, further comprising:

a DC power source connecting to first electrode to the second electrode to impress a potential difference therebetween.

9. The electrochemical system of claim 8, wherein the DC power source is a solar cell.

10. The electrochemical system of claim 8, wherein the DC power source includes an AC power source and a transformer.

11. The electrochemical system of claim 1, wherein the injector injects the charged fluorescent colorants into plant below the second electrode, so that the fluorescent colorants are initially injected into the plant between the ground and the second electrode.

12. A method for infusing fluorescence into a plant in the ground having growth media therein, wherein the growth media includes an aqueous solution having an electrolyte therein, the method comprising:
submerging a first electrode into the growth media;
inserting a second electrode into the plant above the ground;
injecting the plant with charged fluorescent colorants through an injector inserted into the plant; and coupling the first electrode to the second electrode to create a potential difference therebetween to drive the charged fluorescent colorants through the plant above the ground to infuse the plant with fluorescence.

13. The method of claim 12, wherein the charged fluorescent colorants include a compound selected from the group consisting of a pigment, a dye, a color additive, a protein, and a liquid having a fluorescent component therein.

14. The method of claim 12, wherein the charged fluorescent colorants include ions selected from the group consisting of anions, cations, and polarized zwitterions.

15. The method of claim 14, wherein the charged fluorescent colorants include anions and the second electrode is an anode.

16. The method of claim 14, wherein the charged fluorescent colorants include cations and the second electrode is a cathode.

17. The method of claim 12, further comprising:

coupling a power source to first electrode and the second electrode to create the potential difference therebetween.

18. A kit for infusing fluorescence into a plant in the ground having growth media therein, the kit comprising:

an electrochemical cell having a first electrode for inserting into ground having growth media therein and a second electrode for inserting into the plant above the ground with the first electrode being coupled to the second electrode to form a potential difference therebetween; and an injector having charged fluorescent colorants therein;

wherein the injector has the ability to inject charged fluorescent colorants into plant above the ground, so that the potential difference can drive the charged fluorescent colorants through a portion of the plant that is above the ground.

19. The kit of claim 18, wherein the charged fluorescent colorants include a compound selected from the group consisting of a pigment, a dye, a color additive, a protein, and a liquid having a fluorescent component therein.

20. The kit of claim 19, wherein the charged fluorescent colorants include ions selected from the group consisting of anions, cations, and polarized zwitterions.

* * * * *